(12) United States Patent
Hu et al.

(10) Patent No.: US 6,909,780 B1
(45) Date of Patent: Jun. 21, 2005

(54) VOICE MAIL CALL OUT METHOD AND APPARATUS

(75) Inventors: Gilbert Hu, Fremont, CA (US); En-Kuang Lung, Lexington, MA (US); Chiaming Jen, Fremont, CA (US)

(73) Assignee: Altigen Communications, Inc., Fremont, CA (US)

( * ) Notice: Subject to any disclaimer, the term of this patent is extended or adjusted under 35 U.S.C. 154(b) by 505 days.

(21) Appl. No.: 09/590,758

(22) Filed: Jun. 8, 2000

Related U.S. Application Data
(60) Provisional application No. 60/115,879, filed on Jan. 13, 1999.

(51) Int. Cl.[7] ................................................. H04M 3/42
(52) U.S. Cl. .................... 379/211.02; 379/67.1; 379/88.25; 379/210.01
(58) Field of Search ................. 379/67.1, 70, 88.18, 379/88.22, 88.23, 88.25, 210.01, 211.02

(56) References Cited

U.S. PATENT DOCUMENTS

| | | | | |
|---|---|---|---|---|
| 5,146,487 A | * | 9/1992 | Bergsman et al. | 379/88.24 |
| 5,646,982 A | * | 7/1997 | Hogan et al. | 379/88.22 |
| 5,717,741 A | * | 2/1998 | Yue et al. | 379/88.12 |
| 5,751,794 A | * | 5/1998 | Kugell et al. | 379/88.22 |
| 6,014,427 A | * | 1/2000 | Hanson et al. | 379/67.1 |
| 6,393,108 B1 | * | 5/2002 | McElwee | 379/88.19 |

* cited by examiner

*Primary Examiner*—Bing Q. Bui
(74) *Attorney, Agent, or Firm*—Townsend and Townsend and Crew LLP (57) ABSTRACT

A method for operating a telephone server includes receiving an incoming call from a caller, coupling the incoming call to a voice mail server, coupling the incoming call to a voice mail mailbox with the voice mail server, receiving a request from the caller to initiate an outbound call, saving a state of the voice mail server in response to the request, receiving dialing instructions from the caller, processing the dialing instructions to make the outbound call, and restoring the state of the voice mail server after the outbound call is terminated.

20 Claims, 5 Drawing Sheets

VOICE MAIL CALL OUT METHOD AND APPARATUS

CROSS-REFERENCE TO RELATED APPLICATIONS

The present invention disclosure claims priority to U.S. patent application Ser. No. 09/255,358, filed Feb. 23, 1999 which claims priority to U.S. patent application Ser. No. 60/115,879, filed Jan. 13, 1999. These applications are herein by incorporated by reference for all purposes.

BACKGROUND OF THE INVENTION

The present invention relates to computer telephony. More specifically, the present invention relates to telephone and telecommunications servers for storing and returning messages.

Offices today share many modern conveniences, such as fax machines, electronic mail, commonly known as e-mail, high-powered computers, voice mail, and the like. Offices also share many of the same inconveniences, such as jammed copy machines, broken computers, and even disheveled piles of paper having scribbled telephone numbers. Often, just who the telephone number actually calls has long been forgotten, but typically the scraps are not thrown away, "just in case" the numbers are still needed.

These scraps of papers are commonly a byproduct of voice mail systems. In particular, when users retrieve their voice mail messages, the caller leaves a message and a number they can be reached at, also known as a call-back number. So the user can return the call, she typically scribbles the call-back number on an envelope, an unrelated piece of paper, a sticky pad, and the like. Later, when convenient, the user can return the caller's call. As noted above, when the user has a great number of messages to return, these scraps of paper can get shuffled around and even lost. As a result, the user may not be able to return the message. Even if the user can find the number, she must dial it over and over, if there is no answer.

One of the recent solutions to reduce the need for voice mail users to write down call-back numbers left in their mail boxes has been use of technology termed voice mail "Boomerang" One of the pioneering companies in the area of voice mail Boomerang has been AltiGen Communications, the assignee of the present invention. With present boomerang functionality, the caller is prompted to enter her call-back number by way of pressing keys on her telephone keypad, which in turn generates well known DTMF tones. These DTMF tones are then recorded into the voice mail system. Later when the owner of the mail box reviews the message, she can direct the voice mail system to dial the same DTMF tones to return the caller's message.

Drawbacks to having callers leave call-back telephone numbers include that it required the caller to enter their call-back telephone number in a manner different from the way the caller would leave a message. For example, the caller would leave a voice message, and then enter a call-back telephone number with a numeric keypad. This way of providing Boomerang service was potentially dangerous for the caller, for example, if the caller were driving on crowded expressway. In such a case, the caller would have to first fumble for the telephone, take her eyes off traffic to make sure the phone was in the proper, position, and while looking at the telephone keypad press a series of keys. Other such drawbacks could also be envisioned.

Thus, in light of the above, what is needed in the industry are improved methods and apparatus for providing improved methods and apparatus for capturing telephone call-back numbers.

SUMMARY OF THE INVENTION

The present invention relates to methods and apparatus for voice mail messaging. In particular, the present invention relates to novel methods and apparatus for making telephone calls from within a voice mail server.

According to an embodiment of the present invention, a method for operating a telephone server includes receiving an incoming call from a caller, coupling the incoming call to a voice mail server, and coupling the incoming call to a voice mail mailbox with the voice mail server. The method also includes receiving a request from the caller to initiate an outbound call, saving a state of the voice mail server in response to the request, receiving dialing instructions from the caller, and processing the dialing instructions to make the outbound call. After the outbound call has been completed the method includes restoring the state of the voice mail server.

According to another embodiment, a computer program product for operating a telephone server including a processor includes code configured to direct the processor to detect an incoming call from a caller, code configured to direct the processor to couple the incoming call to a voice mail server, and code configured to direct the processor to couple the incoming call to a voice mail mailbox with the voice mail server. Code configured to direct the processor to detect a request from the caller to initiate an outbound call, code configured to direct the processor to save a session of the caller within the voice mail server in response to the request, code configured to direct the processor to detect dialing instructions from the caller, code configured to direct the processor to process the dialing instructions to make the outbound call, and code configured to direct the processor to restore the session of the caller within voice mail server after the outbound call is terminated are also included. The codes are stored in a computer readable media.

According to yet another embodiment, a telephone server includes a processor; and a tangible memory coupled to the processor. The tangible memory includes code that directs the processor to couple an incoming call from a caller to a voice mail server; and code that directs the processor to detect a request from the caller to make a telephone call while the incoming call is coupled to the voice mail server. Code that directs the processor to store a location of the caller within the voice mail server in response to the request, code that directs the processor to process instructions received from the caller to make the telephone call, and code that directs the processor to return to the location of the caller within the voice mail server when the telephone call is finished are also included in the tangible memory.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF SPECIFIC EMBODIMENTS

System Overview

Figure 1:
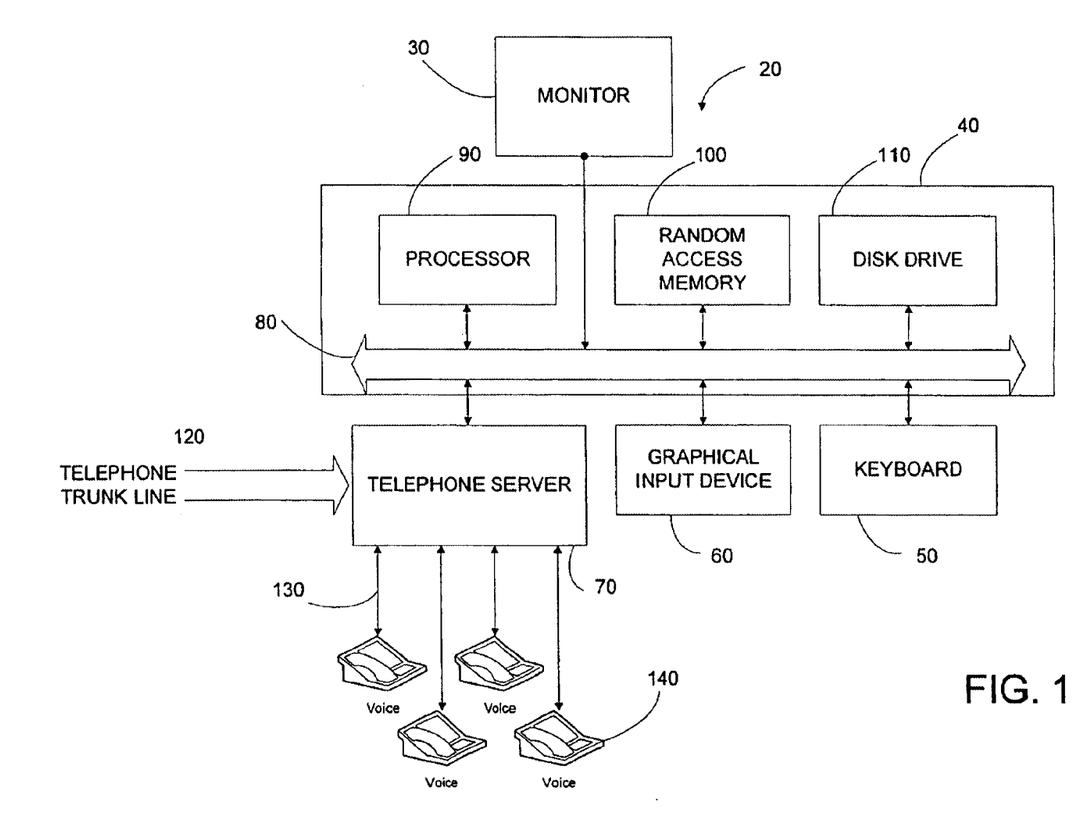
FIG. 1 is a block diagram of a computer telephony system according to a preferred embodiment of the present invention.

FIG. 1 is a block diagram of a computer telephony system 20 according to a junk preferred embodiment of the present invention. Computer telephony system 20 includes a monitor 30, a computer 40, a keyboard 50, a graphical input device 60, and a telephone server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telephone server 70. Handsets 140, (also telephones or telephone handsets) may be coupled to individual telephone lines 130.

Handsets 140 are preferably analog signal telephone handsets, however alternatively they may be any well known type of digital or analog telephone handset. A mouse is but one example of an input device 370, also known as a pointing device. Other types of input devices may include trackballs, drawing tablets, microphones (for voice activated input), and the like. Computer telephony system 20 may be coupled to a computer network through use of a network interface, not shown, such as an Ethernet card, a modem, and the like.

RAM 100 and disk drive 110 are examples of tangible media for storage of data, message files, computer programs, drivers for the telephone server, embodiments of the herein described methods, and the like. Other types of tangible media include floppy disks, removable bard disks, optical storage media such as CD-ROMS and bar codes, and semiconductor memories such as flash memories, read-only-memories (ROMS), and battery-backed volatile memories.

In a preferred embodiment, computer telephony system 20 includes an IBM PC compatible computer having '586 or '686 class based microprocessors, such Pentium0 or PentiumII0 microprocessors from Intel Corporation. Further, in the present embodiment, computer telephony system 20 operates utilizing the WindowsNT0 operating from Microsoft Corporation, to run AltiWareOE0 and AltiMail0 software from AltiGen Communications, Inc. Telephone server 70 is preferably embodied as a Quantum0 ISA or Triton PCI based plug-in expansion boards from AltiGen Communications, Inc.

FIG. 1 is representative of but one type of system for embodying the present invention. It will be readily apparent to one of ordinary skill in the art that many system types of hardware and software configurations are suitable for use in conjunction with the present invention. For example, any computer communications bus may be used with alternative embodiments of the present invention, further computer telephony system 20 may operate under the LINUX operating system, may be ported onto a PowerPC G3 or G4 class microprocessor computer running MAC OS 8.5 from Apple Computer Corporation, =and the like.

Hardware Description

Figure 2:
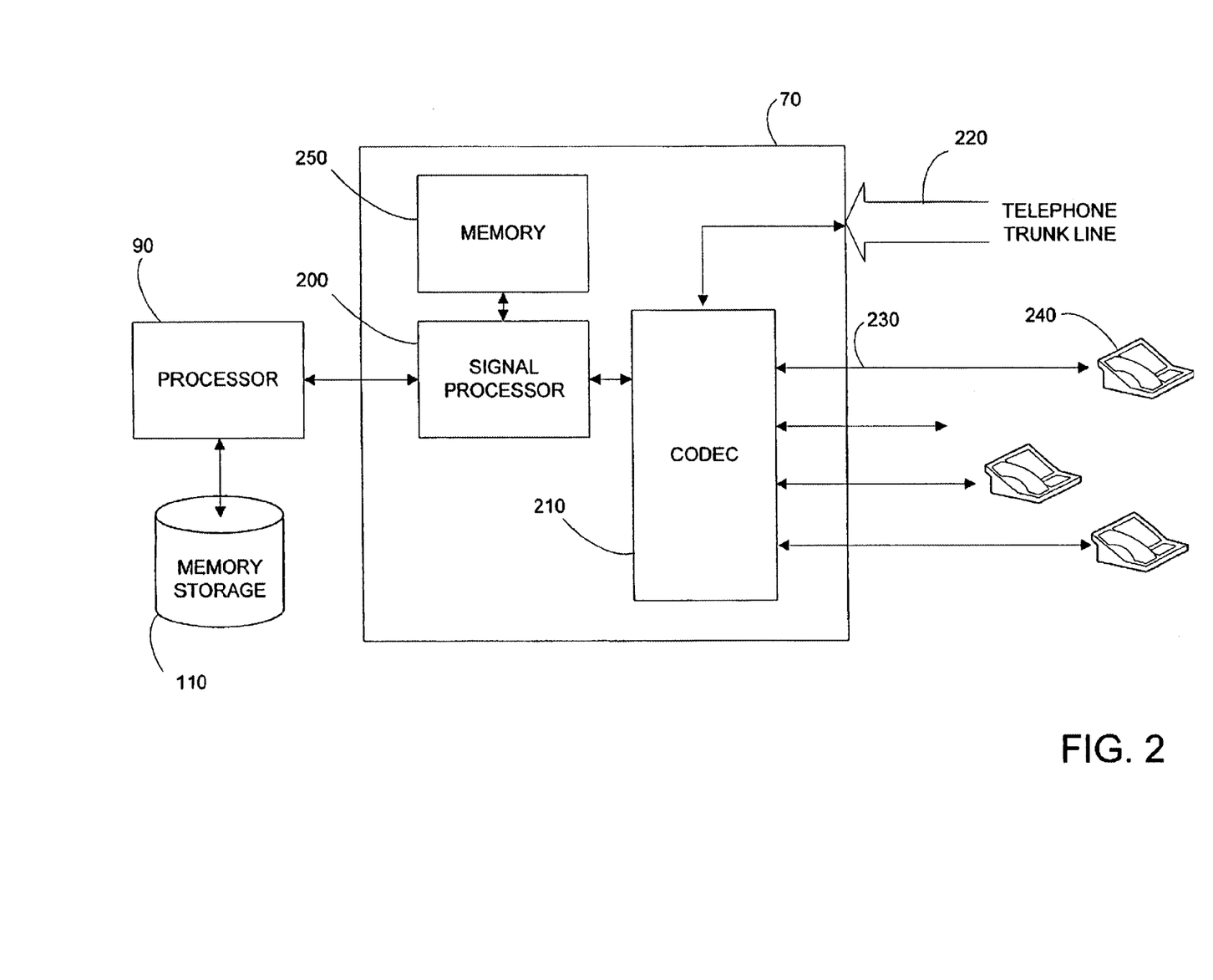
FIG. 2 is a more detailed block diagram of a portion of a computer telephony system according to an embodiment of the present invention.

FIG. 2 is a more detailed block diagram of a portion of a messaging system according to an embodiment of the present invention. FIG. 2 illustrates processor 90, disk drive 110, and telephone server 70. In the present embodiment, telephone server 70 includes a signal processor 200, a digital to analog and analog to digital coder (CODEC) 210, and a memory 250. Telephone server 70 interfaces with telephone trunk lines 220 and with telephone extension lines 230. In turn, telephone extension lines 230 are coupled to telephone handsets 240.

In the present embodiment, memory storage 110 is used to store audio messages, such as voice messages, numeric telephone numbers, caller databases, voice prompt files, and the like, as will be described later.

In FIG. 2, processor 90 is used to control the operation of telephone server 70 according to instructions from the AltiWare0 software previously described. In one embodiment of the present invention, AltiWare0 software, operates in a multi-threaded multi-tasking environment, where each thread monitors the status of a particular telephone extension line 230. The status of the particular telephone extension line is typically represented as a state machine in the software.

In the present embodiment, processor 90 is also used to convert incoming audio messages to message files in a storage format, and to convert message files and voice prompt files from the storage format to an output format (typically digital signals). In the present embodiment, two specific storage formats could be used for audio messages and include the well-known ".wav" file format, and a pulse coded modulation scheme (PCM).

In other embodiments of the present invention, a single storage format may be used. In other embodiments, other formats for storage of audio messages and the like are known to those of ordinary skill in the art and can be used. For example, formats such as the "RealAudio" format, MP3, G.723.1, and the like may be also be used in embodiments of the present invention.

Signal processor 200 is embodied as a Texas Instruments TMS320C5X digital signal processor (DSPs), and is coupled to receive instructions, data, and the like a: from processor 90. Memory 250 is used to store local instructions, a voice recognition algorithm, discussed below, data for signal processor 200, and the like. Of course DSPs from other manufacturers may be used in other embodiments of the present invention.

In the present embodiment, signal processor 200 provides telephone switching functionality to each telephone extension line. For example, in this embodiment, signal processor 200 is used to detect off-hook conditions, to provide tone generation, to detect and process key-pad (DTMF) tones generated from each telephone handset 240, to connect incoming telephone calls to appropriate extensions, and the like.

Signal processor 200 is also used to provide messaging functionality, such as an implementation of a voice mail server. In particular, signal processor 200 outputs instructions, user prompts, messages from voice mail boxes, and the like, to the messaging user. Further, signal processor 200 receives function selections in the form of DTMF tones, spoken instructions, spoken messages, and the like from the messaging user. As discussed above, memory storage 110 may be used to store data associated with the messaging functionality, such as voice prompts, the incoming messages, outgoing messages, and the like. In one embodiment, signal processor 200 and processor 90 share this task.

Signal processor 200 is also used to convert or "recognize" particular incoming audio messages and translate the messages into a computer recognizable form. For example, signal processor 200 can recognize the spoken words "three, two, one" as the numeric number "3, 2, 1", e.g. ASCII character equivalents. As another example, signal processor 200 can recognize the spoken word "yes" or "ok" as an affirmative response, and "no" as a negative response.

In the present embodiment, any conventional voice recognition algorithms may be used, as the voice recognition demands upon signal processor 200 are typically constrained. In embodiments destined for non-English speaking countries, voice recognition algorithms specific to the native languages may be used.

In an alternative embodiment of the present invention, processor 90 may be used to perform the voice recognition process instead of signal processor 200. In still another embodiment, the voice recognition process may be split between processor 90 and signal processor 200.

Signal processor 200 typically comprises a multi-process environment wherein each process monitors the off-hook and the messaging the status of a particular telephone extension line 230. The status of the particular telephone extension line in off-hook mode is represented as a state machine within signal processor 200. Further, the status of the particular telephone extension line within a voice mail messaging mode is represented as another state machine within signal processor 200. In one embodiment of the present invention, signal processor 200 can process up to twelve telephone extension lines being simultaneously in off-hook mode or in voice mail messaging mode. In alternative embodiments, monitoring of states of a greater or fewer number of telephone extension lines 230 is contemplated.

As illustrated in FIG. 2, CODEC 210 is used to provide an interface between users on telephone extension lines 230 and signal processor 200. In the present embodiment, CODEC 210 digitizes analog messages and analog signals from users on telephone extension lines 230. Codec 210 also converts digital signals from signal processor 200, processor 90, and the like, into analog signals for users on telephone extension lines 230. In the present embodiment, the analog signals include audio messages to and from users, dial tone and multifunction (DTMF) tones, and the like. The analog signals also include voice prompts or phrases that provide voice prompting capability to users on telephone extension lines 230 and messages recorded by users. Examples of voice prompts or phrases, include messages that instruct the user which keys on a telephone to select or which key words to speak to perform particular functions, messages that tell the user how many messages are pending, requests for instructions, requests user input, and the like.

Figure 3A:
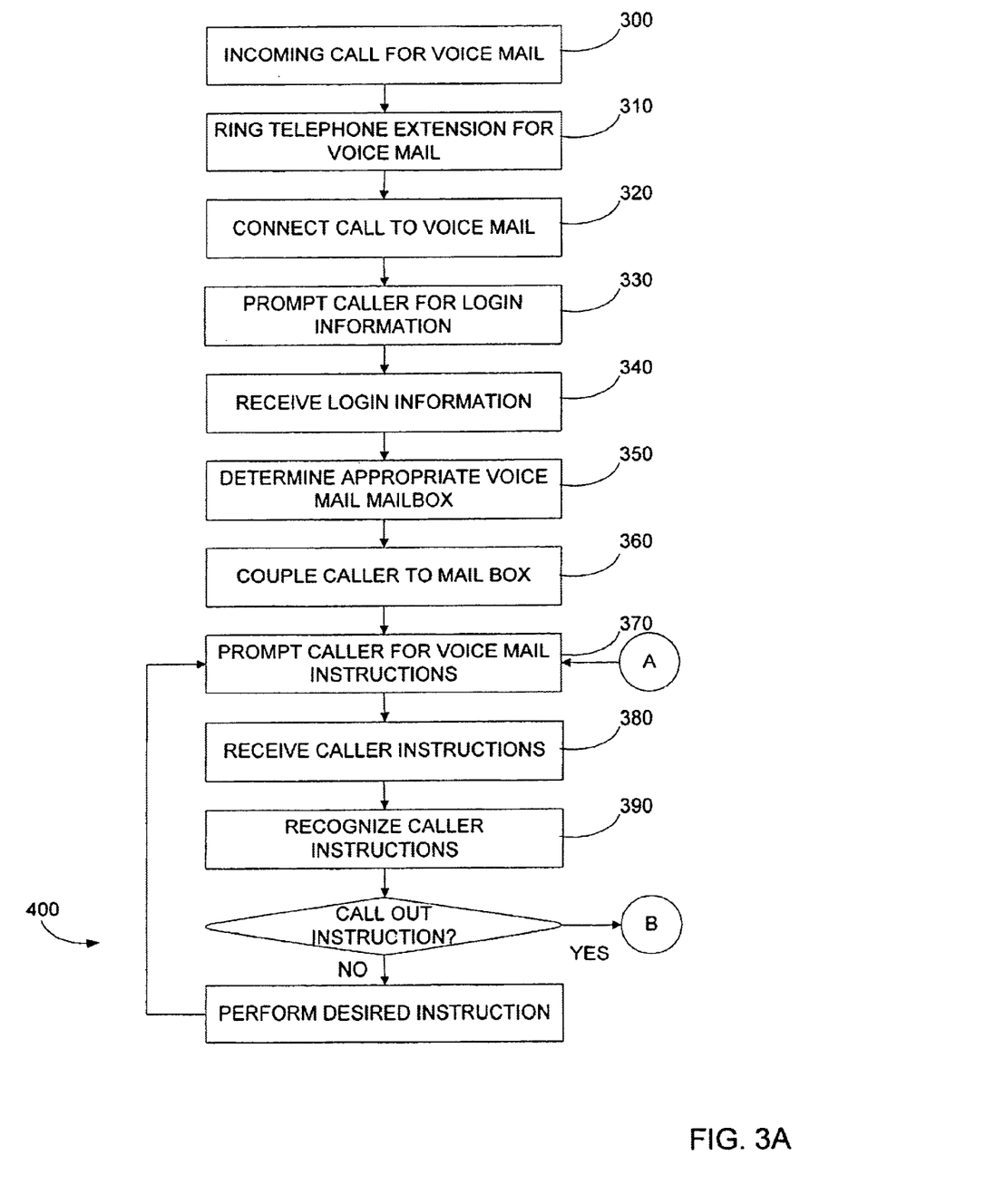
FIGS. 3A and 3B illustrate flow diagrams of an embodiment of the present invention.
Figure 3B:
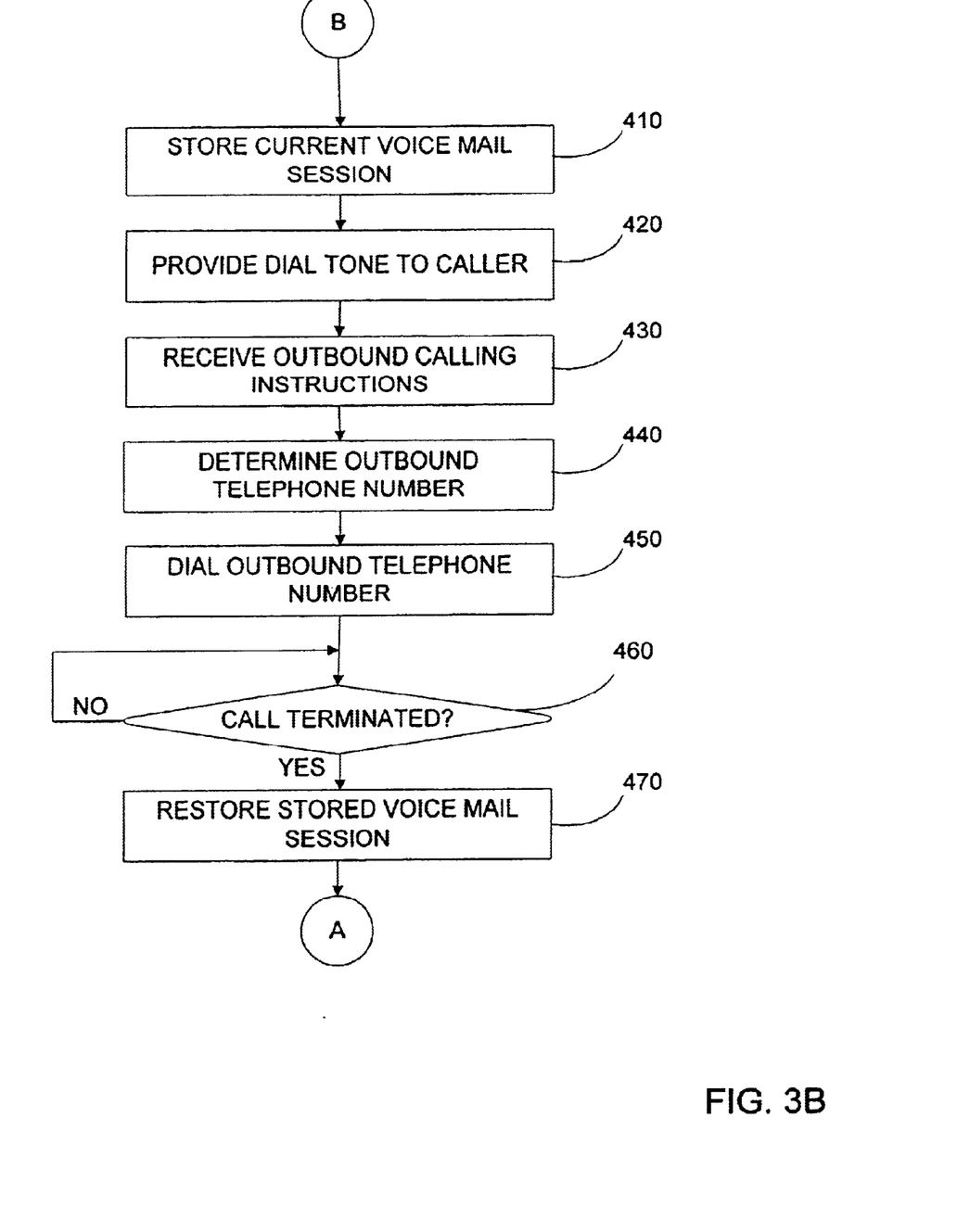

FIGS. 3A and 3B illustrate flowcharts of an embodiment of the present invention.

Initially, an incoming telephone call arrives for a particular telephone extension line, step 300. The incoming call is typically an internal telephone call from another telephone extension line 230 or an external telephone call from telephone trunk 220.

In response to the incoming telephone call, signal processor 200 sends ringing signals to the particular telephone extension, step 310. In the present embodiment, the particular telephone extension is associated with the voice mail server. As with other telephone extensions, the telephone extension typically rings at least once before the incoming call is answered by or coupled to the voice mail server, step 320. It should be understood that in some alternative embodiments, the voice mail extension may not actually ring.

In one embodiment, when the incoming call is from telephone trunk 220, the caller may directly dial a direct-dial telephone number of the voice mail server. In another embodiment, when the incoming call is from another telephone extension line 230, the user may dial the appropriate telephone extension associated with the voice mail server, or use short-cuts to access the voice mail server. Examples of shortcuts include the caller entering a series of DTMF tones, such as those generated by the user pressing keys on the telephone keypad: "##","#30", and the like.

When the caller is connected to the voice mail server, the voice mail server prompts the caller for login information, step 330. In response, the caller may provide the appropriate login information, step 340. In one embodiment, the appropriate login information may include a series of numbers. The series of numbers can include a telephone extension of the caller, for example, the caller's internal telephone extension number, a numeric password, and the like. These numbers are typically input in the form of a series of DTMF tones.

In an alternative embodiment, the appropriate login information may include a word or a series of words spoken by the caller. For example, in response to the login prompt, the user may speak her name, a predetermined word, series of words, series of numbers, her telephone extension number, and the like. The caller may also be prompted by signal processor 200 to enter a password in some embodiments. The password may also be entered by the caller speaking a password, the caller entering a numeric password using DTMF tones, and the like.

In response to the caller supplied login information, signal processor 200 determines the appropriate voice mailbox to login into in the voice mail server for the caller, step 350. In the present embodiment, the appropriate voice mailbox is determined in response to the series of DTMF tones. In an alternative embodiment, signal processor 200 recognizes spoken words by the caller using the above mentioned speech recognition techniques. The recognized words can be used to identify the appropriate voice mailbox. For example, the spoken words can include the caller's name, keywords, a series of numbers, a telephone extension number, and the like.

Signal processor 200 then couples the caller to the appropriate voice mailbox, step 360.

Once the caller is coupled to a voice mailbox, the caller is typically prompted for instructions, step 370. In this embodiment, the voice mail server also plays a series of messages listing the options available to the caller. As an example, in the embodiment illustrated in FIG. 4, the voice mail server may output the menu of commands available in each voice mail state. For example, the caller may hear a message instructing her to hit the "1" button on her telephone keypad to instruct the voice mail server to play any new messages; to hit the "2" button to instruct the voice mail server to play stored messages; and the like.

In the present embodiment, the list (menu) of commands output and available to the caller are different depending upon the state of the caller within the voice mail server. In the present embodiment, the "main menu" state is the first state a caller encounters after logging into a voice mail mailbox.

Next, the caller inputs her selection or instructions, step 380. Similar to the caller input options listed above, the caller may hit a key or a series of keys on her telephone to transmit a DTMF tone or DTMF tones; the caller may speak a word or a series of words; and the like. In response to the caller's selection, signal processor 200 recognizes the selection or instructions, step 390.

The voice mail server then performs a function in response to the associated instruction. step 400. In one embodiment of the present invention, instructions include changing the state of the voice mail server to another voice mail state. For example, entering a state that allows the caller to review messages within the voice mail mailbox, a state that allows the caller to send messages, a state that allows the user to change personal options, and the like. In another embodiment, an instruction includes allowing the user to make outbound telephone calls.

In the present embodiment, the caller hits the "#" key from the main menu state to initiate outbound telephone call. After the caller selection, the current state of the caller within the voice mail server is saved, step 410. For example, the state information may include an identification of the voice mail mailbox the caller is coupled to, the state, for example, the main menu state, and the like; the message most recently recorded or saved; and the like. Other types of state information within the voice mail server should be obvious in light of the present disclosure and may be stored in alternative embodiments of the present invention.

Next, signal processor 200 provides a dial tone to the caller to indicate that the caller can make an outbound call, step 420. In alternative embodiments, a dial tone is not needed, and any other type of audio, visual, and the like indicators can be used to indicate to the caller that an outbound call can be initiated.

In response to the dial tone, the caller inputs dialing instruction, step 430. In the present embodiment, the dialing instructions may include a series of numbers. The series of numbers may directly represent a telephone number, a speed dial number, a predefined password, and the like. These numbers are typically input in the form of a series of DTMF tones. In an alternative embodiment, the dialing instructions may include a word or a series of words spoken by the caller. For example, in response to the dial tone, the user may speak a name, a pre-determined word, series of words, series of numbers, and the like.

In response to the dialing instructions, signal processor 200 determines a telephone number to dial, step 440. In the present embodiment the telephone number is the same as the DTMF tones the caller enters. In an alternative embodiment, signal processor 200 recognizes spoken words by the caller, using the above mentioned speech recognition techniques. The recognized words are typically pre-associated with pre-defined telephone numbers. For example: "Home Office" can be pre-associated with the telephone number of the caller's office; "Ric" can be pre-associated with a telephone number of a friend of the caller; and the like.

In the next step, the telephone number is dialed, step 450. Typically the user will hear the DTMF tones when dialed by signal processor 200.

In an alternative embodiment of the present invention, signal processor 200 (and/or processor 90) will first output the telephone number to the caller before it is dialed. For example, signal processor 200 will orally repeat the number recognized by DTMF tones or recognized by the speech recognition techniques. As an example, in response to the caller stating "Call Ric Carreras," signal processor 200 will retrieve the telephone number associated with that name, e.g. 555-1985, and then repeat "five five five one nine eight five" to the caller. If the caller is satisfied with the telephone number, the caller instructs signal processor 200 to dial the telephone number. In an alternative embodiment, in a default mode, after the telephone number is repeated, the telephone number will be dialed after a slight delay.

Next, signal processor 200 determines when the telephone call has been completed, step 460. In the present embodiment, the caller indicates termination of the telephone call by hitting a DTMF key or a series of DTMF keys. For example, the caller may hit "*#" or "#", and the like on her telephone keypad to indicate that the call is complete. In another embodiment, signal processor 200 monitors the telephone call for a dial tone, for example, after the called party hangs-up. In yet another embodiment, signal processor 200 monitors the ringing signals, for example, if the telephone is unanswered after a number of rings, or receive a network signal to indicated that the caller has hung up. In other embodiments, other ways to monitor the status of the telephone call is envisioned, for example, measuring the cadence, and the like.

After the telephone call is finished, signal processor (and/or processor 90) retrieves the state or session information of the voice mail server, and restores the caller to the stored state or session, step 470. Typically, signal processor 200 then repeats the options available to the caller.

Figure 4:
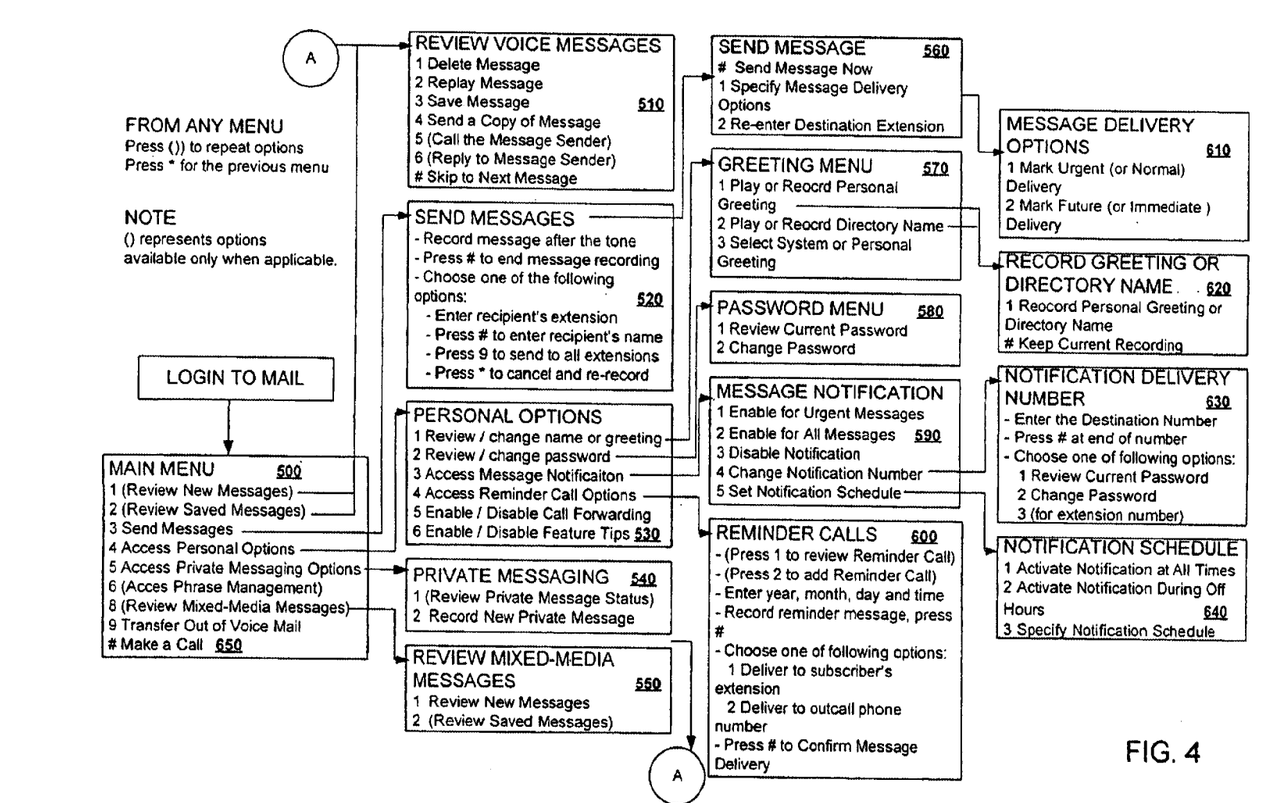
FIG. 4 illustrates an embodiment of the present invention.

FIG. 4 illustrates an embodiment of the present invention. In particular, FIG. 4 illustrates a series of states for a voice mail server.

FIG. 4 includes a main menu state 500, a review menu state 510, a send menu state 520, an options menu state 530, a private menu state 540, a mixed-media menu state 550, a delivery menu state 560, a greeting menu state 570, a password menu state 580, a notification menu state 590, a reminder menu state 600, a delivery menu state 610, a recording menu state 620, a number menu state 630, and a schedule menu state 640.

In FIG. 4, the state of the voice mail server are changed in response to input from the caller. As disclosed above, input may include DTMF tones, spoken words, and Li the like. For example, to move from main menu state 500 to review menu state 510, in this embodiment, the caller hits the "1" or "2" keys; to move from options menu state 530 to greeting menu state 570, the caller hits the "1" key; and the like. To return to the preceding menu state, the user hits a predefined key or series of keys. For example, to move from schedule menu state 640 back to notification menu state 590, the user hits the "*" key.

In FIG. 4, main menu state 500 includes an embodiment of the present invention. As illustrated, one option 650 within main menu state 500 is for the caller to hit the "#" key. In the present invention, if the caller hits the "#" key, the voice mail server stores the caller status in the voice mail server. For example, in the present embodiment, the caller status can include data indicating that the caller has already logged into a voice mail mailbox, that the caller has reviewed some, but not all of her new voice mails, and the like. After the call has been completed, the caller is typically returned to the same place as the caller was before the call was made.

In alternative embodiments of the present invention, the ability for the caller to initiate an outbound call can be made at different states within the voice mail server. For example, in FIG. 4, the ability for the caller to make an outbound call can be included in all states, or in a subset of the states illustrated. As an example, the user may be able to make an outbound telephone call while the user is reviewing messages, i.e. while the caller is within review message state 510. An advantage to such capability is that the caller could immediately place an outbound call right after hearing a message, for example, about an urgent matter, without having to repeat the voice mail server login process, and the like.

It should be understood that the association of DTMF keys to the menu functions in the present embodiment is merely a design choice and does not necessarily limit the embodiments of the present invention. Further, in alternative embodiments of the present invention, the same DTMF or the same series of DTMF tones can be used to initiate an outbound telephone call regardless of the voice mail server state the caller is currently in. For example, the "#" key, or the like could be used within the voice mail server to always mean that the caller wants to initiate an outbound call.

As mentioned in the embodiment above, the voice mail server is embodied as a state machine internal to signal processor 200. Such a combination of elements facilitates construction of embodiments of the present invention. In alternative embodiments of the present invention, other types of voice mail servers can be used to implement the above concepts. For example, a voice mail server independent from the telephone switching unit may also be used. What is desired in such embodiments is that the location of the caller (the caller session) within the voice mail server can be captured, frozen, stored, or saved. Further, it is desired that the caller session can be restored at a different time. By providing such functionality, the caller can exit voice mail without loosing her place within the voice mail server, make a telephone call, and then return to the same place.

CONCLUSION

In the foregoing specification, the invention has been described with reference to specific exemplary embodiments thereof. Many changes or modifications are readily envisioned. For example, the voice recognition algorithm used by alternative embodiments may be different. Further, the voice recognition algorithm may be embodied for operation within processor 90, within signal processor 200, or split between the processors. Further, the embodiments have discussed voice transmissions across telephone lines, although other types of data can also be transmitted, for example, facsimile data, computer data, voice over network, and the like.

In another embodiment, the voice mail caller may be an IP telephone. In such an embodiment, telephone server 70 need not provide dial tones or dialing instructions, or the like from the IP telephone. In such an embodiment, after a call is initiated by the IP telephone, telephone server 70 receives call set-up data in the form of set-up IP packets across a computer network from the IP telephone. Next, telephone server 70 and the IP telephone then exchange voice IP packets across the computer network for entry of key presses, playing of voice prompts, and the like, as described above.

Further, other types of voice mail functionality are contemplated. The voice mail server diagram illustrated in FIG. 4 is merely illustrative of one embodiment of the present invention. Other implementations will most likely include different menu structuring, menu selection options, input options, and the like.

In another embodiment, the outbound telephone call placed may be restricted. For example, signal processor 200 may monitor the telephone number desired by the caller, and may allow or disallow the call based upon the telephone number. As an example, the outbound telephone call may be restricted to number "local" to telephone server 70, may be restricted to only a pre-defined set of numbers, such as particular customer numbers, may be restricted to toll-free numbers, and the like. Other types of restrictions are easily envisioned in light of the present disclosure, for example, limiting the duration of the outbound call, limiting the time of day or days of the week when outbound calls can be placed, and the like.

Restrictions may also be based upon the identity of the caller, as determined by their logging into the voice mail server. Alternatively, restrictions may be applicable to all callers. In some cases, it would be advantageous to initially restrict outbound telephone calls for all users, and enable extended outbound telephone callers to select users on a case by case basis.

The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for operating a telephone server comprises:
receiving an incoming call from a caller;
coupling the incoming call to a voice mail server;
coupling the incoming call to a voice mail mailbox with the voice mail server;
providing a menu of voice mail services to the caller, wherein the menu includes a menu selection to initiate review of incoming voice mail messages, and a menu selection to initiate an outbound call;
receiving a request from the caller of the menu selection to initiate an outbound call;
saving a state of the voice mail server in response to the request;
receiving a telephone number of a receiver of the outbound call from the caller;
processing the telephone number to make the outbound call from the caller to the receiver in real-time; and thereafter
restoring the state of the voice mail server after the outbound call is terminated.

2. The method of claim 1 wherein receiving the request from the caller to initiate the outbound call comprises:
detecting a series of DTMF tones from the caller; and
determining the request in response to the series of DTMF tones.

3. The method of claim 1 wherein receiving the telephone number from the caller comprises detecting a series of DTMF tones from the caller.

4. The method of claim 3 wherein processing the telephone number comprises dialing the series of DTMF tones to make the outbound call.

5. The method of claim 1
wherein receiving the telephone number from the caller comprises detecting a spoken phrase from the caller, and
wherein processing the telephone number comprises:
determining a telephone number associated with the spoken phrase; and
dialing the telephone number to make the outbound call.

6. The method of claim 1 further comprising:
determining a termination of the outbound call;
wherein restoring the state of the voice mail server comprises restoring the state of the voice mail server in response to the termination.

7. The method of claim 1 further comprising:
providing a dial tone to the caller in response to the request.

8. A computer program product for operating a telephone server including a processor comprises:
code configured to direct the processor to detect an incoming call from a caller;
code configured to direct the processor to couple the incoming call to a voice mail server;
code configured to direct the processor to couple the incoming call to a voice mail mailbox with the voice mail server;
code configured to direct the processor to detect a request from the caller to initiate an outbound call to a receiver;
code configured to direct the processor to save a session of the caller within the voice mail server in response to the request;
code configured to direct the processor to detect a telephone number from the caller;
code configured to direct the processor to process the telephone number in real-time to make the outbound call from the caller to the receiver; and
code configured to direct the processor to restore the session of the caller within voice mail server after the outbound call is terminated;
wherein the codes are stored in a computer readable media.

9. The computer program product of claim 8 wherein the code configured to direct the processor to detect a request from the caller to initiate an outbound call comprises:
code configured to direct the processor to detect a series of DTMF tones from the caller; and
code configured to direct the processor to detect the request in response to the series of DTMF tones.

10. The computer program product of claim 9 wherein the code configured to direct the processor to process the telephone number comprises code configured to direct the processor to dial the series of DTMF tones.

11. The computer program product of claim 8 wherein the code configured to direct the processor to detect the telephone number from the caller comprises code configured to direct the processor to detect a series of DTMF tones from the caller.

12. The computer program product of claim 8
wherein the code configured to direct the processor to detect the telephone number from the caller comprises code configured to direct the processor to detect a spoken phrase from the caller; and
wherein the code configured to direct the processor to process the dialing instructions comprises:
code configured to direct the processor to determined a telephone number associated with the spoken phrase; and
code configured to direct the processor to dial the telephone number.

13. The computer program product of claim 8 further comprising code configured to direct the processor to determine a termination of the outbound call;
wherein the code configured to direct the processor to restore the session of the caller within the voice mail server comprises code configured to direct the processor to restore the session of the caller within the voice mail server in response to the termination.

14. A telephone server comprising:
a processor; and
a tangible memory coupled to the processor comprising:
code that directs the processor to couple an incoming call from a caller to a voice mail server,
code that directs the processor to output a menu available selections to the caller wherein the menu includes a selection to call-back voice mail messages, and a selection to enable the caller to make a telephone call;
code that directs the processor to detect a request from the caller of the selection to enable the caller to make a telephone call while the incoming call is coupled to the voice mail server;
code that directs the processor to store a state location of the caller within the voice mail server in response to the request;
code that directs the processor to process a telephone number received form the caller to make the telephone call between the caller and a receiver in real-time;
code that directs the, processor to determine when the telephone call between the caller and receiver is finished; and
code that directs the processor to return to the state location of the caller within the voice mail server when the telephone call to the receiver is finished.

15. The telephone server of claim 14 wherein the code that directs the processor to detect a request from the caller to make the telephone call comprises:
code that directs the processor to detect a series of DTMF tones from the caller; and
code that directs the processor to determine the request in response to the series of DTMF tones.

16. The telephone server of claim 14 wherein the code that directs the processor to process the telephone number received from the caller further comprises
code that directs the processor to detect a series of DTMF tones from the caller; and
code that directs the processor to dial the series of DTMF tones.

17. The telephone server of claim 14 wherein the code that directs the processor to process dialing the telephone number received from the caller further comprises:
code that directs the processor to detect a spoken phrase from the caller; and
code that directs the processor to determine a telephone number associated with the spoken phrase; and
code that directs the processor to dial the telephone number.

18. The telephone server of claim 14 further comprising code that directs the processor to determine when telephone cal is finished; and
wherein the code that directs the processor to return to the location of the caller within the voice mail server comprises code that directs the processor to return to the location of the caller within the voice mail server after the telephone call is finished.

19. The telephone server of claim 14 wherein the code that directs the processor to determine when telephone call is finished comprises code that directs the processor to detect a pre-defines series of DTMF tones.

20. The telephone server of claim 14 wherein the code that directs the processor to determine when telephone call is finished comprises code that directs the processor to detect a dial tone.

* * * * *